MAGNETOSTRICTIVELY DRIVEN MECHANICAL WAVE FILTER

Filed July 19, 1946 2 Sheets-Sheet 1

ROBERT ADLER
INVENTOR.

BY David M. Davis
HIS ATTORNEY

March 21, 1950 R. ADLER 2,501,488

MAGNETOSTRICTIVELY DRIVEN MECHANICAL WAVE FILTER

Filed July 19, 1946 2 Sheets-Sheet 2

ROBERT ADLER
INVENTOR.

BY David M. Davis
HIS ATTORNEY

Patented Mar. 21, 1950

2,501,488

UNITED STATES PATENT OFFICE 2,501,488

MAGNETOSTRICTIVELY DRIVEN MECHANICAL WAVE FILTER

Robert Adler, Chicago, Ill., assignor to Zenith Radio Corporation, a corporation of Illinois Application July 19, 1946, Serial No. 684,803

19 Claims. (Cl. 178—44.3)

This invention relates to wave filters arranged to select or transmit waves of selected frequencies and more specifically to such wave filters of the electromechanical type.

Although the most common wave filters are of the strictly electrical type, incorporating various combinations of resistance, inductance, and capacitance, electromechanical filters incorporating mechanical filter elements possess certain advantages over electrical filters in some applications.

One advantage of an electromechanical filter is that very high quality factors can be obtained with compact elements. As a result, sharp frequency cut-off characteristics can be easily obtained with few filter elements. Consequently, the physical size of such a filter can be kept relatively small.

Electromechanical filters are known to the art in which electrical wave energy is converted into mechanical wave energy, the latter wave energy being passed through mechanical filter elements and then reconverted to electrical wave energy. Such filters have, in general, utilized the flexural mode of vibration and have been operable in the audio frequency range and slightly beyond, but none are known to be operable in the supersonic region substantially beyond 25 kilocycles.

Therefore, it is an object of this invention to provide an improved electromechanical filter which is operable at supersonic frequencies.

Another object of this invention is to provide for a radio receiver, or the like, an improved intermediate frequency electromechanical wave filter having an extremely sharply defined pass band.

A further object of this invention is to provide such a filter which is nevertheless very compact.

A still further object of the invention is to provide an improved wave filter having great resistance to damage from shock or handling, and which is easily and inexpensively made in large quantities.

The features of the present invention which are believed to be novel are set forth with particularity in the appended claims. The present invention, both as to its organization and manner of operation, together with further objects and advantages thereof may best be understood by reference to the following description taken in connection with the accompanying drawings in which:

Figure 1:
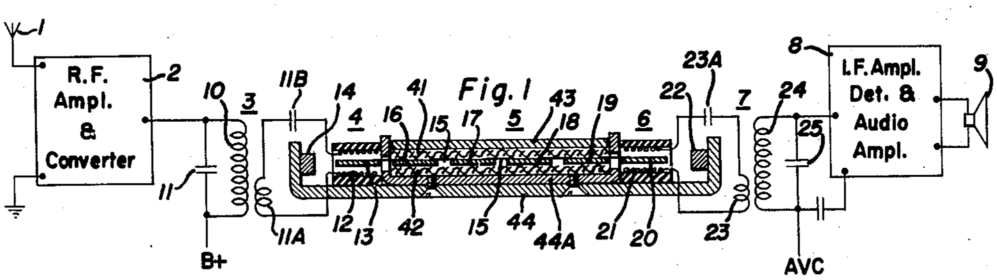
Figure 1 illustrates an elevational cross section of one form of the invention together with cooperating circuits shown schematically.
Figure 2:
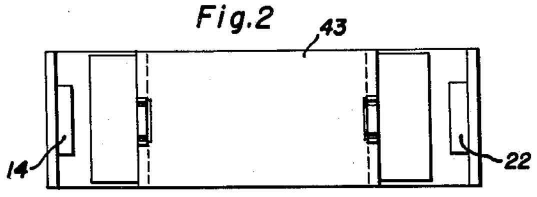
Figure 2 is a top plan view of the device shown in cross-section in Figure 1.
Figure 3:
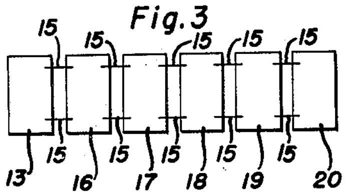
Figure 3 is a top plan view of a portion of the device of Figs. 1 and 2.

In Figure 1 radio frequency signals intercepted by antenna 1 are amplified and converted to signals at an intermediate frequency in amplifier and converter 2. These intermediate frequency signals are coupled through impedance step-down transformer 3 to magnetostrictive translator 4 where signal currents are transformed to mechanical vibrations. These mechanical vibrations are transmitted through intermediate portion 5 and reconverted to signal currents by magnetostrictive translator 6.

The signal currents from translator 6 are coupled through impedance step-up transformer 7 to amplifier-detector 8 where they are detected and amplified in conventional fashion and impressed on speaker 9.

Considering the inventive features of Figures 1 through 4 in detail, like parts in each of these figures having the same reference numerals applied thereto, intermediate frequency signals from converter 2 are impressed on primary winding 10 of impedance step-down transformer 3. Capacitance 11, shunted across primary winding 10, resonates with the inductance of that winding at the intermediate frequency and a relatively large circulating current flows in the loop formed by primary winding 10 and capacitance 11. A voltage is induced across secondary winding 11A by the current flow in primary winding 10 of transformer 3. The secondary winding 11A has relatively few turns compared to primary winding 10 with the result that the impedance reflected into the secondary winding 11A and the voltage appearing across it are both low.

The low impedance secondary winding 11A is connected serially with capacitance 11B and input coil 12 of magnetostrictive translator 4, the impedance of coil 12 also being low, whereby maximum power is transferred to coil 12. Capacitance 11B resonates with the leakage inductance of coil 12 at the intermediate frequency. The current which flows in input coil 12 as the result of the voltage induced in secondary winding 11A produces magnetic flux of varying density in magnetostrictive element 13. The flux produced by a signal current flowing in input coil 12 has a direction parallel to the direction of propagation of energy through the electromechanical filter. Permanent magnet 14 produces in magnetostrictive element 13 a continuous flux having a direction parallel to that produced by current flowing in input coil 12, and serves to bias magnetostrictive element 13 to a sensitive region. In this region the varying magnetic flux produced by signal current flowing in input coil 12 causes a magnetostictive effect in element 13. This magnetostrictive effect takes the form of a variation in the dimension of element 13 parallel to the magnetic flux. The motional energy produced by the magnetostrictive effect is transmitted in sequence through coupling wires 15 and mechanical vibrators 16, 17, 18 and 19, supported between and separated from mounting plates 43 and 44 by means of strips 41 and 42 of resilient material, and then from the last vibrator 19 through wires 15 to a second magnetostrictive element 20 lying within the field of output coil 21 of magnetostrictive translator 6. Permanent magnet 22 produces a continuous flux in magnetostrictive element 20 in a direction parallel to the axis of output coil 21. In the field of permanent magnet 22, variation in that dimension of element 20 which is parallel to that field results in a magnetostrictive effect consisting of a corresponding variation in the magnetic flux density within element 20. A corresponding voltage is thereby induced in output coil 21. This voltage is impressed upon primary winding 23 of impedance step-up transformer 7 through capacitance 23A which is of such magnitude that it resonates with the leakage inductance of output coil 21 at the intermediate frequency. The intermediate frequency signal voltage appearing across secondary 24 of impedance step-up transformer 7 is of increased amplitude, and, when secondary winding 24 is made resonant at the intermediate frequency with capacitance 25, the impedance of the resonant circuit so formed is sufficiently large to provide efficient coupling into the grid circuit of the intermediate frequency amplifier stage which follows.

Modulation-signal detection, amplification, and reproduction are performed in conventional fashion in elements 8 and 9.

Figure 4:
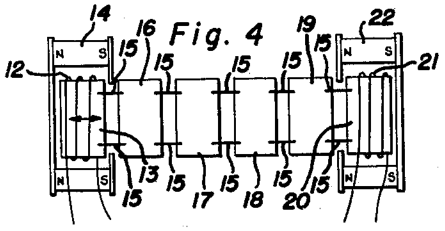
Figure 4 is schematic diagram of the device of Figs. 1 and 2 somewhat rearranged for ease in understanding.

Operation of the electromechanical filter can best be understood by reference to the schematic representation of Figure 4. There is shown in that figure an arrangement for producing a flux through magnetostrictive elements 13 and 20 in a direction parallel to the axes of coils 12 and 21. Magnetic flux from similar poles flows in an aiding fashion through magnetostrictive elements 13 and 20, respectively.

Magnetostrictive elements 13 and 20 and the vibratory elements 16, 17, 18 and 19 individually have a dimension in the direction of motional energy propagation which makes them resonant in a longitudinal mode of vibration in that same direction at a common frequency.

To realize this result, that dimension of each element which is parallel to the direction of motional energy propagation must correspond to a half-wavelength of a desired supersonic wave transmitted through the elements in that direction at that common frequency.

Coupling wires 15 between the various elements of the filter have a length dimension which is approximately one-eighth of the wave length of a longitudinal supersonic wave of the aforesaid common frequency being propagated through them. This means that the terminating magnetostrictive elements and the intermediate vibrational elements have substantially zero mechanical reactance at the aforesaid common frequency while the coupling wires 15 have a finite mechanical reactance at that frequency.

If the frequency of an exciting wave is increased beyond the aforesaid common resonant frequency, the mechanical reactance of elements 13, 16, 17, 18, 19, and 20 increases rapidly, whereas the mechanical reactance of coupling wires 15 decreases slowly. At a frequency which corresponds to the upper limit of the desired pass band, the mechanical reactance of each intermediate vibratory element becomes four times the mechanical reactance of the coupling wires. Up to that frequency transmission through the filter is efficient and substantially uniform as the frequency of the wave impressed on the filter is increased from the common resonant frequency. At that frequency the mismatch between the intermediate vibratory elements and the coupling wires becomes sufficiently severe that the attenuation through the filter begins to be appreciable. Further increase in the frequency of the exciting wave results in a rapid increase in attenuation.

Figure 5:
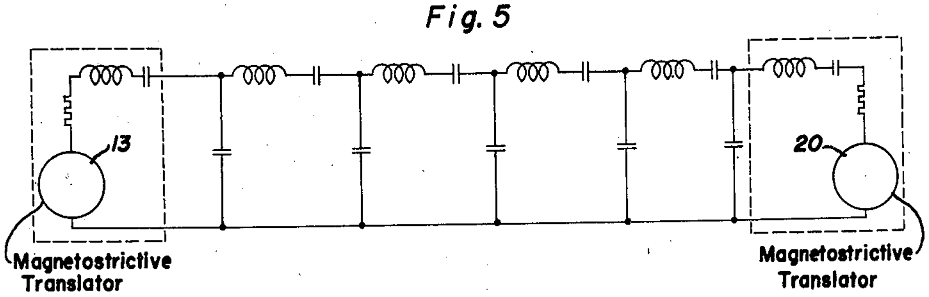
Figure 5 is a schematic illustration of an electrical filter circuit embodying principles similar to those underlying the operation of the invention.

The variations in the mechanical reactance of the resonant elements and coupling wires may be understood more easily by reference to the electrical filter circuit shown in Figure 5. In this figure an electrical network is shown the components of which are so chosen that over corresponding frequency bands the variations in their electrical reactances are analogous to the variations in the mechanical reactances of the elements in the electromechanical filter of Figure 4. The series resonant inductance-capacitance combinations of Figure 5 correspond to the resonant elements 13, 16, 17, 18, 19, and 20 of the electromechanical filter of Figure 1 and the shunting capacitances correspond to the coupling wires 15 of that electromechanical filter.

Magnetostrictive elements 13 and 20 perform dual functions in that they must properly terminate the iterative network as well as efficiently translate electrical oscillations into mechanical vibrations and vice versa.

It is preferred to make magnetostrictive elements 13 and 20 from nickel or a similar material having a high coefficient of magnetostrictive response. It has been observed that elements made from thin sheets of such material have relatively large internal mechanical damping. Such damping might, on first consideration, be thought objectionable, but, on the contrary, it has been found necessary. To understand the useful function of this damping within the magnetostrictive elements, reference can be made to the electrical filter of Figure 5.

In order properly to terminate both ends of the electrical filter, the generator and load should have internal resistances substantially equal to the iterative impedance of the filter. These resistances appear in series with the resonant elements in the terminating portions. If the generator and load do not possess, of themselves, sufficient resistance the resonant elements in the terminating portions can be constructed to provide the proper amount of damping.

Because an interchange of energy occurs in the magnetostrictive translator, its electrical load has its counterpart in the form of reflected mechanical damping in the magnetostrictive element.

This reflected damping is supplemented by the internal mechanical damping of the magnetostrictive element, and together they may be made to provide the necessary terminating resistance for the filter.

On the other hand, it is desirable to have a minimum resistance or mechanical damping in the intermediate portions of the electromechanical filter in order to assure a sharply defined band pass characteristic and low transmission loss for the filter. Therefore, material which has low internal mechanical damping is chosen for intermediate vibratory elements such as elements 16, 17, 18 and 19 of the electromechanical filter shown in Figure 1. A material possessing this low damping characteristic is, purely by way of example, stainless steel. It is not a requisite nor a disadvantage for the material used in the intermediate vibratory portions to show some magnetostrictive response. In designing these elements so that they will resonate at a desired frequency it is possible, if they are magnetostrictive, to place them in some resonating system of the magnetostrictive type, and to tune them accurately to the desired common frequency.

The material used in the coupling members, wires 15, should also have low internal mechanical damping.

The mechanical damping coefficient for a material can be defined in terms of its attenuation of sound or mechanical vibrations of a given frequency. Materials like lead or rubber have high internal mechanical damping coefficients since they attenuate sound very effectively. Examples of materials having low mechanical damping coefficients are quartz, aluminum, and steel.

The coefficient of magnetostrictive response of a material can be defined in terms of the amount of variation in a given dimension of a sample of the material when there is a given variation in the magnetic flux flowing through the material. A sample of nickel, for instance, when subjected to a varying magnetic flux shows larger dimensional variations than most other materials and is said to have a high coefficient of magnetostrictive response.

Figure 6:
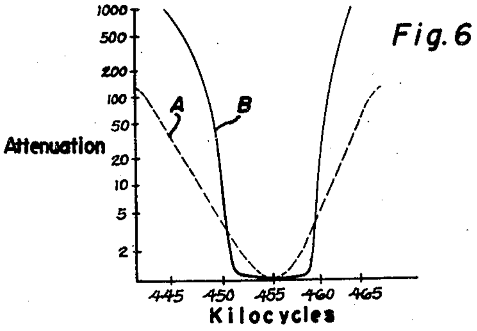
Figure 6 is a frequency response characteristic curve for a radio receiver incorporating the filter shown in Figure 1, superimposed upon the corresponding curve for a conventional superheterodyne receiver.

Curve A of Figure 6 is the overall frequency response characteristic, of selectivity curve, for a radio receiver of the superheterodyne type which might be found on the present market. Curve B shows a frequency response characteristic, or selectivity curve, for a superheterodyne receiver incorporating the electromechanical filter shown in Figure 1 and described in connection with that figure.

The superiority of a radio receiver incorporating the electromechanical filter shown in Figure 1, over a radio receiver available on the present market is immediately apparent from a comparison of these two curves A and B of Figure 6. Curve B shows a substantially flat characteristic of frequency response over an 8 kilocycle band of frequencies. This characteristic is desirable in order to assure equal amplification of both side band frequencies existing in the usual amplitude modulated radio signal. Curve A shows that the ordinary radio receiver does not provide this flat frequency response characteristic. In the case of a receiver incorporating the electromechanical filter described previously, the attenuation of radio signals lying more than 4 kilocycles either side of the desired tuned frequency is seen to be extremely rapid.

Figure 7:
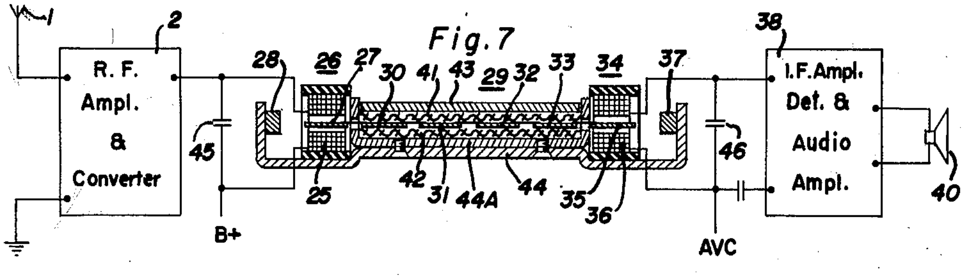
Figure 7 illustrates, in a fashion similar to that of Figure 1, a somewhat different embodiment of the invention.

In Figure 7 intermediate frequency signals from radio frequency amplifier and converter 2 are coupled directly to the high impedance input coil 25 of magnetostrictive translator 26. The current which flows in high impedance input coil 25 as a result of these intermediate frequency signals being impressed thereon, produces a magnetic flux of varying density which threads magnetostrictive element 27 and causes magnetostrictive effects therein. A permanent magnetic flux from permanent magnet 28 passes through magnetostrictive element 27 in a direction parallel to the direction of the varying magnetic flux produced by input coil 25, this direction being parallel to the longitudinal axis of the electromechanical filter. Magnetostrictive motion of element 27 is propagated through intermediate portion 29, which includes vibratory elements 30, 31, 32 and 33, into the second magnetostrictive element 35. These elements may be identical with the corresponding elements described in connection with the electromechanical filter of Figure 1. Correspondingly, the coupling means between these six elements are wires as described in connection with the electromechanical filter of Figure 1. The motional energy received by magnetostrictive element 35 in magnetostrictive translator 34 is transformed into electrical impulses in high impedance output coil 36. Permanent magnet 37 performs a biasing function whereby a constant magnetic flux flows through magnetostrictive element 35. The electrical impulses appearing in high impedance output coil 36 are intermediate frequency signals corresponding to the signals impressed on high impedance input coil 25 except that the band of frequencies in which the signals lie has been sharply limited. The impedance of output coil 36, when resonated by capacitance 46, is sufficiently high that it can be directly connected to the grid input circuit of a succeeding amplifier stage. Intermediate frequency amplifier, detector, and audio amplifier stages 38 perform their conventional functions and supply an audio signal corresponding to the modulation on the intermediate frequency signals received from the filter 39. This audio signal is reproduced by speaker 40.

In the two electromechanical filters just described, certain relationships must exist between the mechanical impedances of the intermediate vibratory elements, the magnetostrictive terminating elements, and the coupling wires. By referring to the iterative filter network of the electrical type shown in Figure 5 which is analogous to the electromechanical filters being considered, it is seen that the electrical filter network is terminated by half-sections each of which is connected to a terminating resistance which has a value equal to the iterative impedance of the filter. In these half-sections the series reactances are one-half the values for a full section, but the resonant frequencies are unaltered.

For a material of given density and elastic modulus, mechanical reactance at any given frequency is proportional to the cross sectional area normal to the direction of wave propagation. The materials in the terminating and intermediate elements, and in the coupling members are closely similar with respect to their densities and elastic moduli. Each terminating magnetostrictive element must have one-half the cross-sectional area, taken in a plane at right angles to the direction of propagation of motional energy through the filter, of each individual vibratory element in the intermediate portion of the filter.

To obtain the proper band pass characteristics for an electromechanical filter of the type described in connection with Figures 1 and 7, the compliance and, consequently, the diameter of the coupling wires must be so chosen that the total cross-sectional area of the coupling wires between adjacent elements has a ratio to the cross-sectional area of each magnetostrictive terminating portion, taken in a plane at right angles to the direction of propagation of motional energy through the filter, which ratio is substantially equal to the ratio of the desired band width of the electromechanical filter to its mean operating frequency.

Flat rectangular bodies of metal are capable of flexural vibration at a great number of frequencies. To prevent vibratory elements 30, 31, 32, and 33 from transmitting substantial energy at these frequencies, the mounting strips 41 and 42 are preferably constructed and arranged effectively to function as damping strips or spurious mode dampers. These supporting and damping strips may be of rubber, or any other material which attenuates flexural vibrations effectively. As positioned, the supporting and damping strips have little effect on motion in the desired longitudinal direction. Supporting strips 41 and 42 in the structure of Figure 1 are also preferably constructed and arranged effectively to serve as spurious mode dampers. Plates 43 and 44, and bracket 44A shown in Figures 1 and 7, serve as electrostatic and electromagnetic shields between the input and output coils in the terminating portions of the electromechanical filters shown in those figures.

Figure 8:
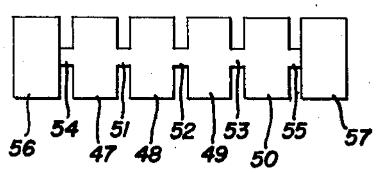
Figure 8 illustrates a different form of the arrangement shown in Figure 3.

In Figure 8 intermediate vibratory elements 47, 48, 49 and 50 and coupling members 51, 52, 53, 54 and 55 are stamped from a single sheet of material having low internal mechanical damping. Purely by way of example, this material may be stainless steel. Elements 56 and 57 are of a magnetostrictive material and may be welded or otherwise solidly secured to coupling members 54 and 55. Such a fabricating technique is simple and inexpensive. That relationship between the cross-sectional area of the coupling members and the cross-sectional area of the vibratory elements which was described as being necessary in connection with the propagation of motional energy in the longitudinal mode, would require that the coupling members be impractically narrow. As a result, the intermediate vibratory elements, magnetostrictive elements, and the coupling members must be operated in a different mode of vibration.

Figure 9:
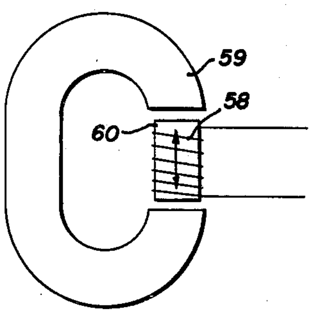
Figs. 9 and 10 illustrate different arrangements of certain parts of the devices of Figs. 1 and 7.

In the schematic diagram of Figure 9, coil 58 and permanent biasing magnet 59 each produces a flux in magnetostrictive element 60 the direction of which is normal to the direction of propagation of motional energy, with the result that the coupling members, in an electromechanical filter incorporating this method for exciting the magnetostrictive driving element, transmit energy in a shear mode. Coupling members having a practical cross-sectional area then no longer give an excessive degree of coupling between the vibratory elements. This excitation method may be used in conjunction with an electromechanical filter incorporating the vibratory elements described in connection with Figure 8.

Figure 10:
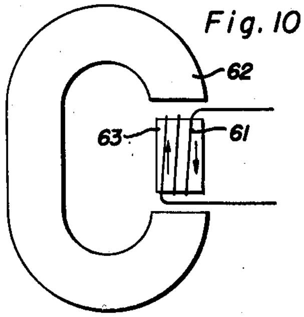

In Figure 10 the input coil 61 produces a varying magnetic flux the direction of which is parallel to the direction of motional energy propagation through a filter utilizing this excitation method. However, permanent magnet 62 produces in magnetostrictive element 63 a flux which is normal to the direction of propagation of motional energy. The resultant magnetostrictive forces cause the element to vibrate in a shear mode. The coupling members in a filter incorporating this method of excitation also operate in a shear mode and thus, coupling members such as those shown in Figure 8 can be used.

The magnetostrictive terminating and intermediate vibratory elements described thus far, have been of a rectangular shape; thus each of the elements has length, width and thickness dimensions, one being intermediate the other two. With the method of magnetostrictively exciting the filters shown in Figures 1 and 7, this intermediate dimension determines the frequency of resonance of the elements. In the excitation method of Figure 10, the intermediate dimension again determines the frequency of resonance of the elements. With the method of excitation described in connection with Figure 9, the long dimension is normal to the direction of motional energy propagation, and this long dimension determines the frequency of resonance of a filter incorporating this method of excitation.

Figure 11:
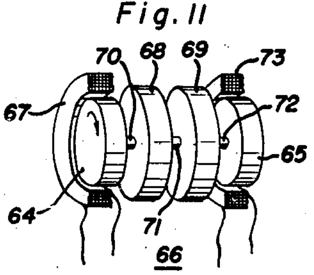
Figure 11 is a perspective view, partially in cross-section, of still another form of the invention.

In Figure 11, a different mode of motional energy propagation is utilized. Circular discs 64 and 65 in the terminating portions of the filter 66 are of a magnetostrictive material and are so magnetized that magnetic flux flows around the periphery of the disc and, thus, these discs may be described as being circularly magnetized. The flux lines can be visualized as lying in closed rings along the periphery of the terminating discs. Input coil 67 is circular and is oriented about the periphery of magnetostrictive element 64 so that, in response to signal currents flowing through the coil, it produces a magnetic flux, the direction of which is parallel to the axis of the filter. The magnetostrictive forces within this disc 64, as a result of the combined effects of these two crossed magnetic fields, cause the opposite faces of disc 64 to vibrate with opposing angular displacements. The thickness of disc 64 is chosen to be one-half of the wavelength of a torsional wave, of a frequency corresponding to the lower frequency of the desired pass band, being propagated axially through the disc. The displacements of the opposite faces of the disc 64 are 180° out of phase with each other. Vibratory energy is coupled to discs 68 and 69, in the intermediate portion of the electromechanical filter, by rods 70 and 71, respectively. These rods vibrate in a torsional mode. Discs 68 and 69 vibrate in the same fashion as does disc 64, with the opposite faces of the discs vibrating in opposing angular relationship to each other. Rod 72 couples energy in a torsional mode to magnetostrictive disc 65 in the second terminating portion of the electromechanical filter 66. The internal torsional vibration of magnetostrictive disc 65 produces signal currents in output coil 73. These signal currents are similar to the signal currents impressed on input coil 67 except that the band of frequencies in which the signals lie is restricted. The magnetostrictive elements 64 and 65 are made from a material which has a relatively high magnetostrictive response coefficient and high internal mechanical damping. Vibratory discs 68 and 69 and coupling rods 70, 71 and 72 are made from a material having low internal mechanical damping so as to provide maximum selectivity and minimum attenuation for the filter including these elements.

It is to be understood that the filter described and shown may be used in other applications than in radio receivers. For instance, these filters may find use in carrier telephony and in repeater circuits.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An electromechanical band-pass filter including: a plurality of vibratory elements comprising thin, flat sheets of material having a low coefficient of internal mechanical damping; coupling members intercoupling said vibratory elements in an iterative chain; and a pair of terminating elements mechanically coupled to the respective ends of said chain and comprising thin, flat sheets of material having high coefficients of internal mechanical damping and magnetostrictive response.

2. An electromechanical band-pass filter including: a plurality of vibratory elements comprising thin, flat sheets of material having a low coefficient of internal mechanical damping; coupling members intercoupling said vibratory elements in an iterative chain; a pair of terminating elements mechanically coupled to the respective ends of said chain and comprising thin, flat sheets of material having high coefficients of internal mechanical damping and magnetostrictive response and individually having an intermediate frequency-determining dimension; and means for magnetostrictively exciting said terminating elements in a vibrational mode at a frequency determined by said intermediate dimension.

3. An electromechanical band-pass filter including: a plurality of vibratory elements comprising thin, flat sheets of material having a low coefficient of internal mechanical damping and individually having a predetermined cross-sectional area in a plane perpendicular to the direction of propagation of motional energy through said filter; coupling members intercoupling said vibratory elements in an iterative chain; and a pair of terminating elements mechanically coupled to the respective ends of said chain and comprising thin, flat sheets of material having high coefficients of internal damping and magnetostrictive response and individually having a cross-sectional area substantially equal to one-half of said predetermined area, whereby the mechanical impedances of said terminating elements and said vibratory elements are substantially matched.

4. An electromechanical band-pass filter including: a plurality of vibratory elements comprising thin, flat sheets of material having a low coefficient of internal mechanical damping and individually having predetermined length, width, and thickness dimensions; coupling members intercoupling said vibratory elements in an iterative chain; and a pair of terminating elements mechanically coupled to the respective ends of said chain and comprising thin flat sheets of material having high coefficients of internal damping and magnetostrictive response and individually having length and width dimensions substantially equal to those of said individual vibratory elements and a thickness dimension equal to substantially one-half of that of said individual vibratory elements, whereby the mechanical impedances of said terminating elements and said vibratory elements are substantially matched.

5. An electromechanical band-pass filter including: a plurality of vibratory elements comprising thin, flat sheets of material having a low coefficient of internal mechanical damping; a pair of terminating elements comprising thin, flat sheets of material having high coefficients of internal mechanical damping and magnetostrictive response; compliant members of low mass intercoupling said vibratory elements in an iterative chain; and additional compliant members of low mass mechanically coupling said terminating elements to the respective ends of said chain.

6. An electromechanical band-pass filter including: a plurality of vibratory elements comprising thin, flat sheets of material having a low coefficient of internal mechanical damping; a pair of terminating elements mechanically resonant at a common frequency with said vibratory elements and comprising thin, flat sheets of material having high coefficients of internal mechanical damping and magnetostrictive response; compliant members of low mass, individually having an effective coupling length substantially equal to one-eighth of the wavelength corresponding to said common frequency, intercoupling said vibratory elements in an iterative chain; and additional compliant members similar to said first-mentioned members mechanically coupling said terminating elements to the respective ends of said chain.

7. An electromechanical band-pass filter including: a plurality of vibratory elements comprising thin, flat sheets of material having a low coefficient of internal mechanical damping; a pair of terminating elements, mechanically resonant at a common frequency with said vibratory elements, comprising thin, flat sheets of material having high coefficients of internal mechanical damping and magnetostrictive response and individually having a predetermined cross-sectional area taken in a plane perpendicular to the direction of propagation of motional energy through said filter; and a plurality of wires, individually having an effective coupling length of one-eighth wavelength at said common frequency, intercoupling said vibratory elements in an iterative chain and mechanically coupling said terminating elements to the respective ends of said chain, the total cross-sectional area of said wires coupling any two of said elements, taken in said plane, being related to said predetermined area in substantially the same ratio as that of the band width of said filter to said common frequency.

8. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for magnetically biasing said terminating elements to a sensitive region; means for impressing an input signal on one of said terminating elements; and means for deriving an output signal from the other of said terminating elements.

9. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for magnetically biasing said terminating elements to a sensitive region; means for impressing an input signal on one of said terminating elements to excite said vibratory elements into vibration in a longitudinal mode; and means responsive to longitudinal vibrations of the other of said terminating elements for deriving an output signal from said filter.

10. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements in a direction substantially parallel to the direction of propagation of motional energy through said filter to bias said terminating elements to a sensitive region; means for impressing an input signal on one of said terminating elements to excite said vibratory elements into vibration in a longitudinal mode; and means responsive to longitudinal vibrations of the other of said terminating elements for deriving an output signal from said filter.

11. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements in a direction substantially perpendicular to the direction of propagation of motional energy through said filter to bias said terminating elements to a sensitive region; means for impressing an input signal on one of said terminating elements; and means for deriving an output signal from the other of said terminating elements.

12. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements to bias said terminating elements to a sensitive region; means responsive to an input signal for inducing a varying magnetic flux in one of said terminating elements in a direction substantially parallel to the direction of said field; and means responsive to vibrations of the other of said terminating elements for deriving an output signal from said filter.

13. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements to bias said terminating elements to a sensitive region; means responsive to an input signal for inducing a varying magnetic flux in one of said terminating elements in a direction substantially perpendicular to the direction of said field; and means responsive to vibrations of the other of said terminating elements for deriving an output signal from said filter.

14. An electromechanical band-pass filter including: a plurality of vibratory elements comprising thin, flat sheets of material having a low coefficient of internal mechanical damping; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements in a direction substantially parallel to the direction of propagation of motional energy through said filter to bias said terminating elements to a sensitive region; means responsive to an input signal for inducing a varying magnetic flux in one of said terminating elements in a direction substantially parallel to that of said field; and means responsive to vibrations of the other of said terminating elements for deriving an output signal from said filter.

15. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements in a direction substantially perpendicular to the direction of propagation of motional energy through said filter to bias said terminating elements to a sensitive region; means responsive to an input signal for inducing a varying magnetic flux in one of said terminating elements in a direction substantially parallel to that of said field; and means responsive to vibrations of the other of said terminating elements for deriving an output signal from said filter.

16. An electromechanical band-pass filter including: a plurality of vibratory elements comprising thin, flat sheets of material having a low coefficient of internal mechanical damping; coupling members intercoupling said vibratory elements in an iterative chain; a pair of terminating elements comprising thin, flat sheets of material having high coefficients of internal mechanical damping and magnetostrictive response and mechanically coupled to the respective ends of said chain; means for providing a substantially constant unidirectional magnetic field in said terminating elements in a direction substantially perpendicular to the direction of propagation of motional energy through said filter, means responsive to an input signal for inducing a varying magnetic flux in one of said terminating elements in a direction substantially perpendicular to that of said field; and means responsive to vibrations of the other of said terminating elements for deriving an output signal from said filter.

17. An electromechanical band-pass filter including: a plurality of vibratory elements comprising thin, flat sheets of material having a low coefficient of internal mechanical damping and individually having a dimension parallel to the direction of propagation of motional energy through said filter of substantially one-half wavelength at frequencies within the pass band of said filter; coupling members intercoupling said vibratory elements in an iterative chain; and a pair of terminating elements comprising thin, flat sheets of material having high coefficients of internal mechanical damping and magnetostrictive response and mechanically coupled to the respective ends of said chain.

18. An electromechanical band-pass filter including: a plurality of vibratory elements comprising thin, flat sheets of material having a low coefficient of internal mechanical damping and individually having a dimension parallel to the direction of propagation of motional energy through said filter of substantially one-half wavelength at frequencies within the pass band of said filter; a pair of terminating elements comprising thin, flat sheets of material having high coefficients of internal mechanical damping and magnetostrictive response; and a plurality of compliant coupling members of low mass, individually having a length of substantially one-eighth wavelength at said frequencies, intercoupling said vibratory elements in an iterative chain and mechanically coupling said terminating elements to the respective ends of said chain.

19. An electromechanical band-pass filter including: a plurality of vibratory elements comprising thin, flat sheets of material having a low coefficient of internal mechanical damping; coupling members, integrally constructed with said vibratory elements, intercoupling said vibratory elements in an iterative chain; and a pair of terminating elements comprising thin, flat sheets of material having high coefficients of internal mechanical damping and magnetostrictive response and mechanically coupled to the respective ends of said chain.

ROBERT ADLER.

REFERENCES CITED

The following references are of record in the file of this patent:

UNITED STATES PATENTS

| Number | Name | Date |
|---|---|---|
| 1,693,806 | Cady | Dec. 4, 1928 |
| 1,742,773 | Loewe | Jan. 7, 1930 |
| 1,855,054 | Johnson | Apr. 19, 1932 |
| 2,141,277 | Nickel | Dec. 27, 1938 |
| 2,268,495 | Petty | Dec. 30, 1941 |
| 2,318,417 | Phelps | May 4, 1943 |
| 2,342,813 | Mason | Feb. 29, 1944 |